United States Patent [19]

Marshall et al.

[11] Patent Number: 4,648,956

[45] Date of Patent: Mar. 10, 1987

[54] ELECTRODE CONFIGURATIONS FOR AN ELECTROPHORETIC DISPLAY DEVICE

[75] Inventors: Thomas Marshall, Flushing; Edward H. Stupp, Spring Valley, both of N.Y.

[73] Assignee: North American Philips Corporation, New York, N.Y.

[21] Appl. No.: 688,097

[22] Filed: Dec. 31, 1984

[51] Int. Cl.⁴ .............................. B01K 5/00; G02 1/40
[52] U.S. Cl. ........................ 204/299 EC; 204/299 R; 350/362; 430/32; 430/35; 430/36
[58] Field of Search ...... 204/299 R, 299 EC, 299 PE, 204/181 PE; 430/32, 35, 36; 350/362

[56] References Cited

U.S. PATENT DOCUMENTS

| | | | |
|---|---|---|---|
| Re. 28,360 | 3/1975 | Evans et al. | 204/299 R |
| 3,668,106 | 6/1972 | Ota | 204/299 PE |
| 3,689,399 | 9/1972 | Ota | 204/299 PE |
| 3,756,693 | 9/1973 | Ota | 204/299 PE |
| 4,043,655 | 8/1977 | Silverberg | 204/299 PE |
| 4,294,518 | 10/1981 | O'Connor et al. | 350/362 |
| 4,522,472 | 6/1985 | Liebert et al. | 350/362 |

*Primary Examiner*—Arthur P. Demers
*Attorney, Agent, or Firm*—Paul R. Miller

[57] ABSTRACT

An electrophoretic display device is set forth having various electrode schemes in order to modulate transmission of light through the device. The electrophoretic particles of the suspension form an imaging structure relating to an array of small unit cells or pixels which are turned on or off by appropriate electrical signals. Accordingly, the pigment particles totally cover transparent electrodes, which condition can be changed by applying the appropriate electric field to the opposite electrode. By this structure, various alphanumeric displays can be constructed.

11 Claims, 4 Drawing Figures

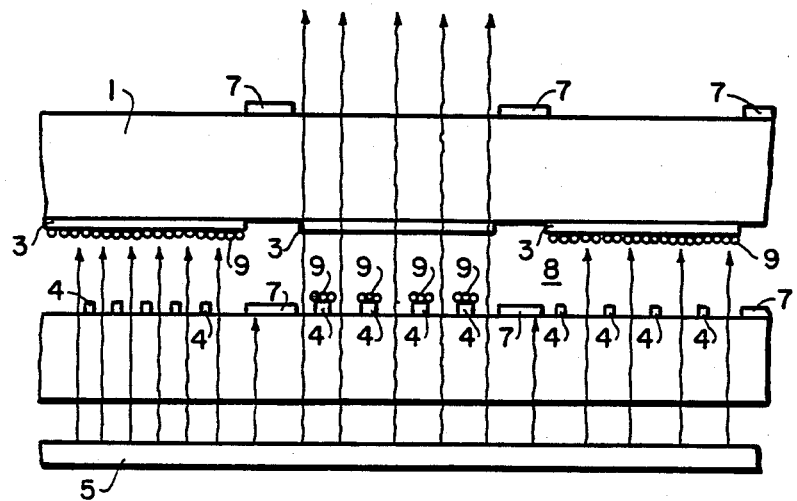
FIG.1
FIG.4
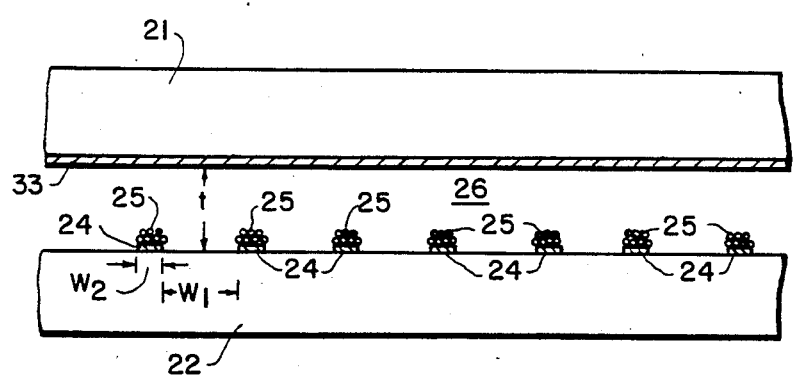

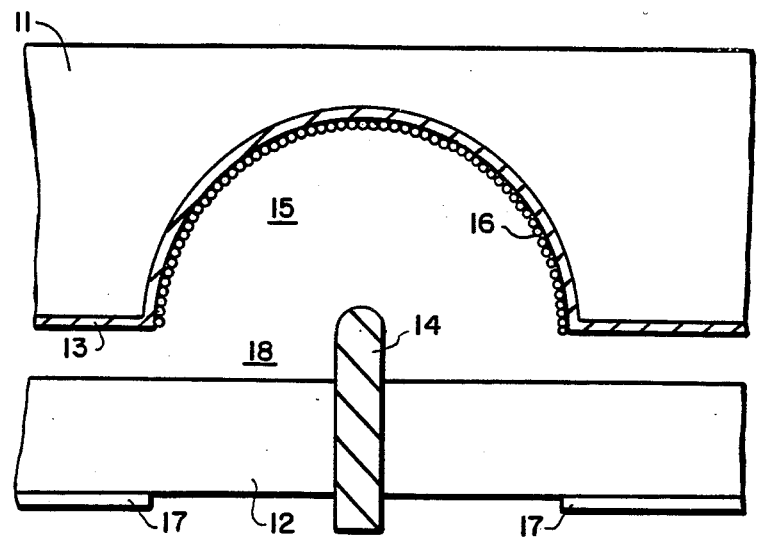
FIG.2
FIG.3
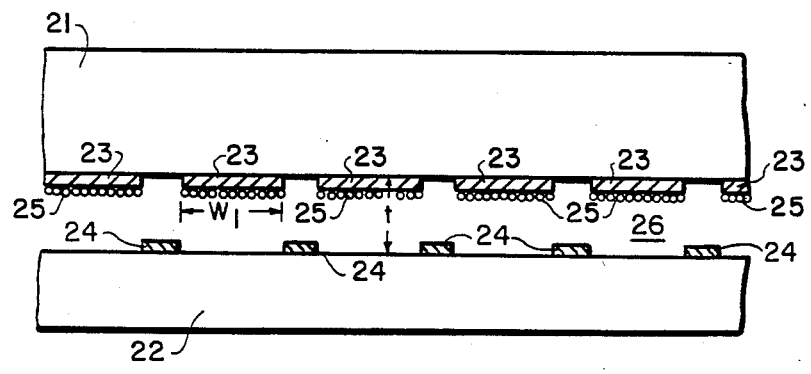

ELECTRODE CONFIGURATIONS FOR AN ELECTROPHORETIC DISPLAY DEVICE

The present invention is directed to an electrophoretic display device having improved display characteristics. In particular, the display employs transmission of light through the display device with appropriate electrode configurations providing an image.

Electrophoretic display devices offer an improved technique for displaying images in various systems of optical displays. The majority of the prior art devices for electrophoretic displays have relied upon ambient light exposure and reflection of light in a display in order to view color or contrast changes. Various prior art arrangements, such as U.S. Pat. No. 3,663,395 to Strickler, U.S. Pat. No. 3,909,116 to Kohashi, and U.S. Pat. No. 4,218,302 to Dalisa et al have offered variations of producing incident light at one side of the display and viewing or observation of the display from the opposite side. Each of these prior arrangements, however, have relied upon reflected light techniques at the incident light side in order to view the display.

The presently claimed invention, on the other hand, provides light transmission for an electrophoretic display device in which light transmission is controlled by electrode structures. These structures make it possible to view directly an electrophoretic display device wherein the display is illuminated from the side opposite to the observer.

Electrophoretic display devices provide visible display of images in an electrophoretic fluid by appropriate application of electric fields to the electrophoretic fluid. Such electric fields modulate light by the electrophoretic fluid.

Electrophoretic fluids are constituted principally by a fluid or dye of one color containing a colloidal suspension of pigment particles of a different color or brightness contrast. Upon appropriate application of electric fields, the pigment particles are concentrated at the electrodes at one side or the other of the electrophoretic fluid to cause either viewing of the color of the colloidal particles, or viewing of the color of the electrophoretic fluid, for example.

By appropriate electrode arrangements according to the present invention, the basic imaging structure in an electrophoretic display includes a rectangular array of small unit cells, or pixels, which are turned "on" or "off" by appropriate electrical signals. That is, the colloidal pigment particles cover an appropriate electrode structure or region during the "off" period, but during an "on" period, the pigment is transported to a relatively small region blocking only a small portion of light from passing through the pixel. When the entire device is illuminated from the rear, an image is viewed which is formed by dots of light against a dark background. This scheme can be used with almost any method of addressing each pixel where such addressing occurs by imposing a DC voltage level between two pixel electrodes.

The electrode schemes according to the present invention include one in which the electrodes at one side of the display device are formed in a plurality of hemispherical cavities, while the electrodes at the other side of the display device include a metal pin inserted into the hemispherical cavity. Such a structure provides a radially isotropic electric field within the electrophoretic cell which leads to uniform pigment distribution.

In another scheme according to the present invention, the display device includes parallel plates being separated by a small distance. In such a structure, one electrode arrangement would have electrodes of a given width at one side of the display device and being at a reference potential, whereas electrodes at the other side of the display device are of a second width which is interspersed with the width of the electrodes at the first surface. These second electrodes are the driven electrodes, being asymmetrically driven to positive or negative values enabling the switching of the electrophoretic device. The ratio of the width of the electrodes to the distance between the parallel substrates should be small as possible to first, improve field uniformity, and second, to maximize the transmission of light when the pixel is turned "on" consistent with the ability of the driven electrodes to gather the pigment. Such an arrangement involves that the overall electrode size should be as small as possible so that many stripes of light per pixel will occur.

A variation of this structure is provided by the provision of a single electrode covering the surface of one of the substrates, whereas the strip electrodes at the opposite surface have a given width and separation similar to the strip electrode sizes as noted above. This structure enables an electric field to be more uniform since the single electrode has no corners. Otherwise, a higher pigment concentration is needed to cover the electrodes.

The features and advantages of the present invention will be described in more detail by way of example relative to the several embodiments of the present invention, with reference to the drawing figures, in which:

FIG. 1 illustrates in partial cross-section the operation according to the present invention;

FIG. 2 illustrates the arrangement of one set of electrodes according to a first embodiment of the present invention;

FIG. 3 illustrates a second embodiment of an electrode structure according to the present invention; and FIG. 4 illustrates a variation of the embodiment of FIG. 3.

The arrangement of the present invention may be seen by reference to FIG. 1 in which a first transparent substrate is provided at a small distance from a second transparent substrate 2. The first substrate 1 has a plurality of electrodes 3 on an inner surface thereof, while the substrate 2 has a plurality of electrodes 4 formed in facing relationship to electrodes 3. A light source 5 is provided at one side of the display structure to transmit light through the display device to an observer 6.

From the electrophoretic solution 8, a plurality of pigment particles 9 are formed on the respective electrodes, according to the potentials applied thereto. For example, as seen in FIG. 1, the pigment particles 9 are formed as a coating on electrodes 3 in two segments of the display device, whereas the pigment particles 9 are formed over the electrodes 4 at the opposite side of the electrophoretic fluid 8 in another segment of the display device. This latter corresponds to the "on" scheme of imaging in the electrophoretic device since the electrodes 4 being coated with pigment particles 9 only block a small portion of light from the source 5 from passing through the display device. Consequently, areas between the electrodes 4 are made visible by light passing through the display device. By appropriate arrangement of the electrode structures, alpha-numeric displays can be formed. The covering of the electrodes 3 by the pigment particles 9 covers the display device at those portions with the color of the particles so that no light passes through the display device.

Appropriate opaque portions 7 are applied to each substate surface 1 and 2 in order to separate the seveal electrode structures 3 and 4. By this means, light only passes through the area designated by the respective electrodes 3 and 4 in the instance when the pigment particles 9 are attracted to the electrodes 4.

One of the advantages of the present invention is the provision of electrode patterns on the two substrates that enable illumination with transmitted light. A first scheme of accomplishing this may be seen by a first embodiment, as illustrated in FIG. 2. In this embodiment, a substrate 11 has a plurality of hemispherical cavities over which, at both the inner face of the substrate 11 and the cavity 15, an electrode 13 is coated. An indium-tin oxide or other transparent electrical conductor is provided for the electrode 13. Moreover, this electrode is maintained at ground potential. At a second substrate 12, metal pin electrodes 14 are inserted there through to extend into the hemispherical cavity.

This arrangement enables a radially isotropic electric field to be arranged within the electrophoretic cell; and therefore, enables uniform pigment distribution over the surface of the hemispherical cavity. As such, light passing through the substrate 11 will be blocked by the pigment particles 16 in the cavity 15. During switching of the arrangement to an "on" time, the pigment 16 will travel to the metal pin electrode, thereby freeing the area in the hemispherical cavity around the pin 14 to pass light. Opaque layers 17 are provided for masking the areas between the hemispherical cavities. The electrode 14 is driven to either a plus or minus potential in order to switch the electrophoretic cell into the "on" or "off" condition.

It has been found that a disadvantage of this structure is that fabrication of the hemispherical cells is difficult. Further, refraction and total internal reflection is possible within the cavities and index matching is required between the substrate surfaces and the electrophoretic suspension 18 between the substrates 11 and 12.

A further arrangement of the present invention may be seen in FIG. 3 which illustrates another embodiment of the present invention. In this embodiment, two parallel substrates 21 and 22 are separated by a distance t in which the electrophoretic suspension 26 with pigment particles 25 is provided. The pigment particles 25 are induced onto electrodes 23 on the surface of the substrate 21. Such covering of the electrodes 23 with the pigment particles enables only the passage of light through the areas between the electrodes 23.

These areas correspond to the width $w_2$ being the size or width of the electrode strips 24 on the substrate 22. However, these electrodes 24 are opaque so that light does not pass through them. Upon being switched to the "on" condition, the electrophoretic particles on the electrodes 23 will migrate to the electrodes 24 thereby enabling light to pass through the structure. The electrodes 24 are the driven electrodes, being asymmetrically driven to either a plus or minus polarity in order to switch the electrophoretic cell. The electrodes 23, on the other hand, are at a reference potential, such as ground. These electrodes 23 may be of an indium-tin oxide material or any other similar transparent material, while the electrodes 24 are of an opaque conductive material.

The electrodes 23 extend perpendicular to the drawing figure along the length of the substrate 21. These electrodes can be crossed-linked in an H pattern. Similarly, the electrodes 24 extend perpendicular to the paper on the substrate 22.

In this structure of FIG. 3, the electrodes 23 have a width $w_1$, while the electrodes 24 have a width $w_2$. The width of the electrode 24 is equal to the separation of the electrodes 23, and the electrodes 24 extend along the areas of separation of the electrodes 23. The distance between the substrates 21 and 22 is the distance or thickness t. In this structure, the ratio of $w_1$ to t should be as small as possible to improve field uniformity. Further, the ratio of $w_2$ to $w_1$ should be as small as possible to maximize transmission of light when the pixel is in the "on" condition, consistent with the ability of the $w_2$ electrodes to gather with the pigment particles. These two considerations require that the overall electrode size should be as small as possible, so that there will be many electrode stripes per pixel.

A variation of this embodiment may be seen in FIG. 4 in which the electrode 33 is a single electrode covering the surface of the substrate 21. This electrode 33 is at a reference potential, such as ground, and is opposite to the plurality of electrodes 24 which are opaque. These electrodes 24 are shown in FIG. 4 as having electrophoretic pigment particles 25 formed thereon so that the "on" condition is established.

In this arrangement, the electric field is more uniform because the ground electrode 33 has no corners. Moreover, 100% of the front surface of the substrate 21 is transparent inasmuch as electrode 33 is transparent. In such an arrangement, a higher pigment concentration is necessary to cover this electrode during the "off" condition.

Otherwise, the same relationships between $w_1$, $w_2$, and t exist as that shown in FIG. 3.

What we claim:

1. An electrophoretic display device comprising
a transparent panel including respectively a first transparent substrate, a first transparent electrode configuration on said first transparent substrate, an electrophoretic suspension, a second electrode configuration, and a second transparent substrate for mounting said second electrode configuration adjacent said electrophoretic suspension,
at least one area of said second transparent substrate being free of said second electrode configuration said first electrode configuration extending at least in alignment with said one area of said second transparent substrate, and
a light source positioned to project light through said transparent panel from one side thereof, said display device being transparent to light from said source in alignment with said area in response to the application of a potential between said first and second electrode configurations whereby an illuminated image of said area is visible at the side of said transparent panel opposite said one side upon the application of said potential between said first and second electrode configurations.

2. An electrophoretic display device according to claim 1, wherein said first transparent substrate includes a hemispherical cavity facing said second transparent substrate and aligned with said area, said cavity having a hemispherical conductive coating forming at least a part of said first electrode configuration, and wherein said second electrode configuration includes a metal pin electrode extending into said hemispherical cavity.

3. An electrophoretic display device according to claim 1, wherein said first transparent substrate and said second transparent substrate are parallel spaced apart planar plate-like structures.

4. An electrophoretic display device according to claim 3, wherein said first electrode configuration includes a first plurality of parallel electrodes extending in one dimension of said first transparent substrate, said first plurality of parallel electrodes being transparent, and each of said first plurality of parallel electrodes having a width $w_1$ and being separated from one another by a distance $w_2$, where $w_1$ is greater than $w_2$, and wherein said second electrode configuration includes a second plurality of parallel electrodes extending in the same direction as said first plurality of parallel electrodes, said second plurality of parallel electrodes being opaque, and each of said second plurality of parallel electrodes having a width $w_2$ and being separated from one another by a distance $w_1$.

5. An electrophoretic display device according to claim 3, wherein said first electrode configuration includes a single transparent electrode covering said first transparent substrate, and wherein said second electrode configuration includes a plurality of opaque parallel electrodes extending on said second transparent substrate in one direction, each of said plurality of opaque parallel electrodes having a width $w_2$ and being separated from one another by a distance $w_1$, where $w_1$ is greater than $w_2$.

6. The display device of claim 1 wherein said one side of said transparent panel is the side thereof adjacent said second transparent substrate.

7. The display device of claim 1 further comprising opaque members disposed on at least one of said first and said second transparent substrates and placed adjacent to the respective one of said first and said second electrode configurations on said respective first and second transparent substrates.

8. The display device of claim 1 wherein said first electrode configuration comprises an electrode portion and said second electrode configuration comprises a plurality of electrodes aligned with said electrode portion with at least one said area between said electrodes.

9. The display device of claim 8 further comprising opaque means on at least one of said first and second transparent substrates positioned to inhibit transmission of light through said regions of said display device other than determined regions aligned with areas between said electrodes 10. The display device of claim 1 wherein said first and second electrode configurations are positioned on non-aligned portions of said first and second transparent substrates respectively, said second electrode configuration being opaque.

11. The display device of claim 1 wherein said first electrode configuration is a single electrode substantially continuous throughout said display device.

* * * * *